United States Patent
Sohn et al.

(10) Patent No.: US 8,120,736 B2
(45) Date of Patent: Feb. 21, 2012

(54) LIQUID CRYSTAL DISPLAY AND METHOD FOR MANUFACTURING THE SAME

(75) Inventors: Ji-Won Sohn, Seoul (KR); Jun-Woo Lee, Anyang-si (KR); Jiangang Lu, Suwon-si (KR); Seung-Hoon Lee, Yongin-si (KR); Seon-Ah Cho, Busan (KR); Jun-Hee Na, Asan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 12/019,315

(22) Filed: Jan. 24, 2008

(65) Prior Publication Data

US 2008/0284960 A1     Nov. 20, 2008

(30) Foreign Application Priority Data

May 3, 2007 (KR) .................. 10-2007-0043102

(51) Int. Cl.
  *G02F 1/1333* (2006.01)
(52) U.S. Cl. .................... 349/128; 349/33; 349/96
(58) Field of Classification Search .............. 349/33, 349/106, 143, 129, 124, 96, 117, 118, 119, 349/121
See application file for complete search history.

(56) References Cited

U.S. PATENT DOCUMENTS

| | | | |
|---|---|---|---|
| 6,525,794 B1 * | 2/2003 | Kim et al. | 349/129 |
| 6,900,869 B1 * | 5/2005 | Lee et al. | 349/129 |
| 7,030,950 B2 * | 4/2006 | Van De Witte et al. | 349/117 |
| 7,102,706 B2 * | 9/2006 | Kim et al. | 349/88 |
| 7,289,179 B2 * | 10/2007 | Chang et al. | 349/141 |
| 7,446,830 B2 * | 11/2008 | Kim et al. | 349/93 |
| 7,515,214 B2 * | 4/2009 | Ueda et al. | 349/33 |
| 7,719,502 B2 * | 5/2010 | Hanaoka et al. | 345/87 |
| 2003/0067579 A1 * | 4/2003 | Inoue et al. | 349/187 |
| 2005/0140862 A1 * | 6/2005 | Jang et al. | 349/113 |
| 2005/0264730 A1 * | 12/2005 | Kataoka et al. | 349/114 |
| 2008/0129932 A1 * | 6/2008 | Chang et al. | 349/96 |
| 2008/0266503 A1 * | 10/2008 | Lyu | 349/124 |

* cited by examiner

*Primary Examiner* — Akm E Ullah
(74) *Attorney, Agent, or Firm* — H.C. Park & Associates, PLC (57) ABSTRACT

A liquid crystal display is provided that includes first and second panels facing each other, an alignment layer disposed on at least one of the first and second panels, a fixing member disposed on the surface of the alignment layer to fix the alignment structure of the alignment layer, and liquid crystal materials disposed between the first and second panels. The liquid crystal materials include liquid crystal molecules that have a pre-tilt angle and are disposed on the alignment layer.

19 Claims, 8 Drawing Sheets

FIG. 5 a lower panel an upper panel

FIG. 8 a lower panel an upper panel

FIG. 9

LIQUID CRYSTAL DISPLAY AND METHOD FOR MANUFACTURING THE SAME

CROSS-REFERENCE TO RELATED APPLICATION

This application claims priority from and the benefit of Korean Patent Application No. 10-2007-0043102, filed on May 3, 2007, which is hereby incorporated herein by reference as if fully set forth herein.

BACKGROUND OF THE INVENTION

1. Field of the Invention

The present invention relates to a liquid crystal display and a method for manufacturing the same.

2. Discussion of the Background

A liquid crystal display (LCD) is one of the most widely used flat panel displays. An LCD includes two panels provided with field-generating electrodes, such as pixel electrodes and a common electrode, and a liquid crystal (LC) layer interposed therebetween. The LCD displays images by applying voltages to the field-generating electrodes to generate an electric field in the LC layer that determines the orientations of LC molecules in the LC layer to adjust the polarization of incident light.

The LC molecules of LCDs may be initially aligned in a predetermined direction through a rubbing process. Also, the liquid crystal molecules of LCDs may be initially aligned at a pre-tilt angle by rubbing the LC molecules in a vertical alignment (VA) mode so that the direction in which the LC molecules will rotate when an electric voltage is applied can be controlled.

The pre-tilt angle may be realized through a contact rubbing method and a light alignment method. The alignment layer may be rubbed by using a roller to which physical pressure is applied in the contact rubbing method and the alignment layer may be irradiated by ultraviolet rays in the light alignment method to form the pre-tilt angle.

However, the alignment force acting on the liquid crystal molecules decreases over time in the light alignment method, as compared to the contact rubbing method, so the initial alignment of the LC molecules may become scattered.

SUMMARY OF THE INVENTION

The present invention provides an LCD that may uniformly maintain the initial alignment of the LC molecules over time.

The present invention also provides a method of manufacturing an LCD that may uniformly maintain the initial alignment of the LC molecules over time.

Additional features of the present invention will be set forth in the description which follows, and in part will be apparent form the description, or may be learned by practice of the invention.

The present invention discloses a liquid crystal display including first and second panels facing each other, an alignment layer disposed on at least one of the first and second panels, a fixing member disposed on the alignment layer, and liquid crystal materials disposed between the first and second panels. The fixing member fixes the alignment structure of the surface of the alignment layer, and the liquid crystal materials include liquid crystal molecules having a predetermined pre-tilt angle disposed on the alignment layer.

The present invention also discloses a method for manufacturing a liquid crystal display including providing a first panel having a first alignment layer, providing a second panel having a second alignment layer, forming an alignment structure in the first and second alignment layers by irradiating the alignment layers with linearly polarized ultraviolet rays, and providing a liquid crystal assembly. The liquid crystal assembly includes the first panel, the second panel, and a liquid crystal layer including a liquid crystal material, a monomer, and a photo initiator disposed between the first and second panels. The monomers are polymerized by irradiating the liquid crystal layer to form a fixing member on the first alignment layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Now, an LCD according to an exemplary embodiment of the present invention will be described with reference to FIG. 1, FIG. 2, FIG. 3, FIG. 4, FIG. 5, FIG. 6, FIG. 7, FIG. 8, and FIG. 9.

Embodiment 1

Figure 1:
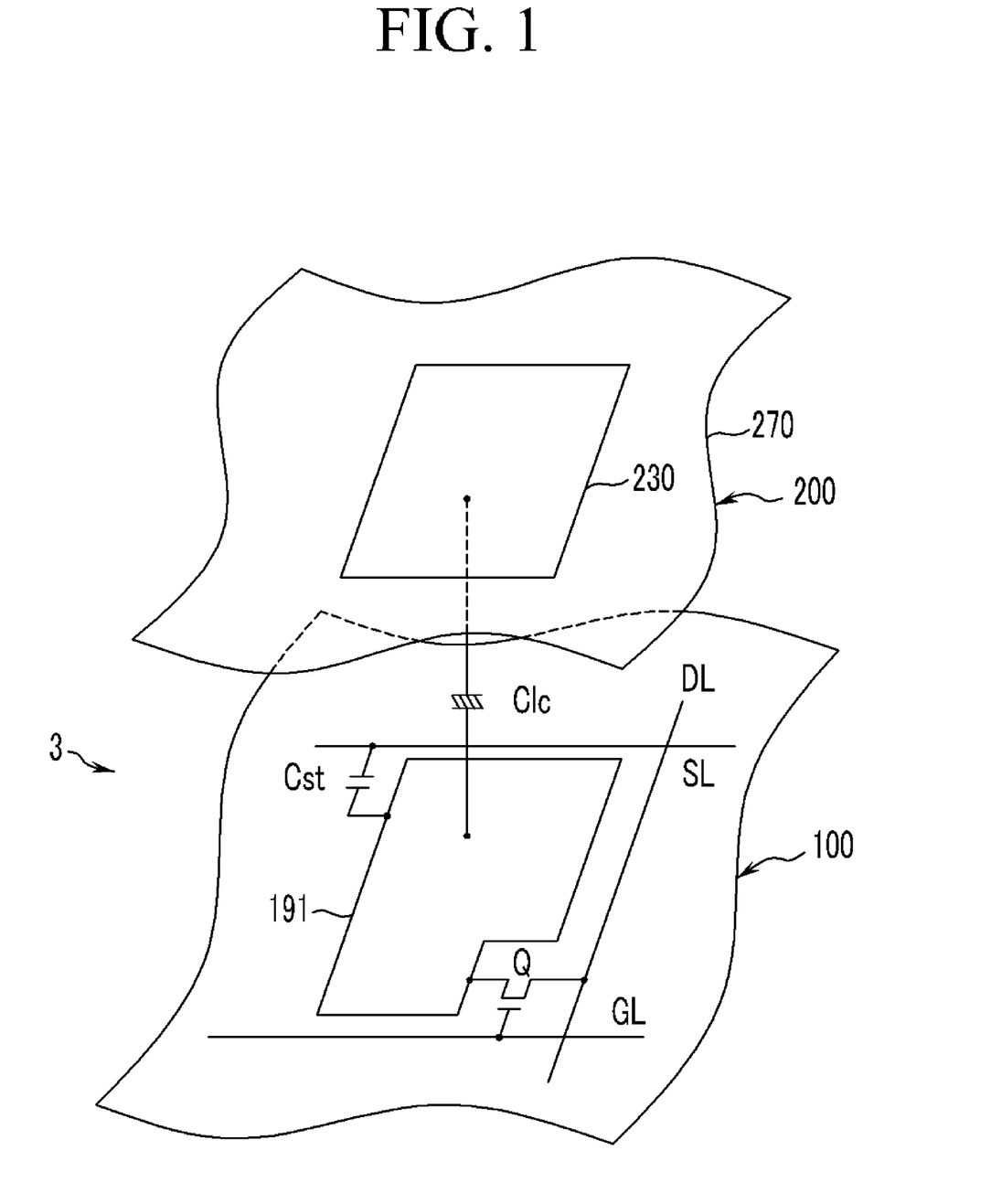
FIG. 1 is an equivalent circuit diagram of a pixel of an LC panel assembly according to an exemplary embodiment of the present invention.
Figure 2:
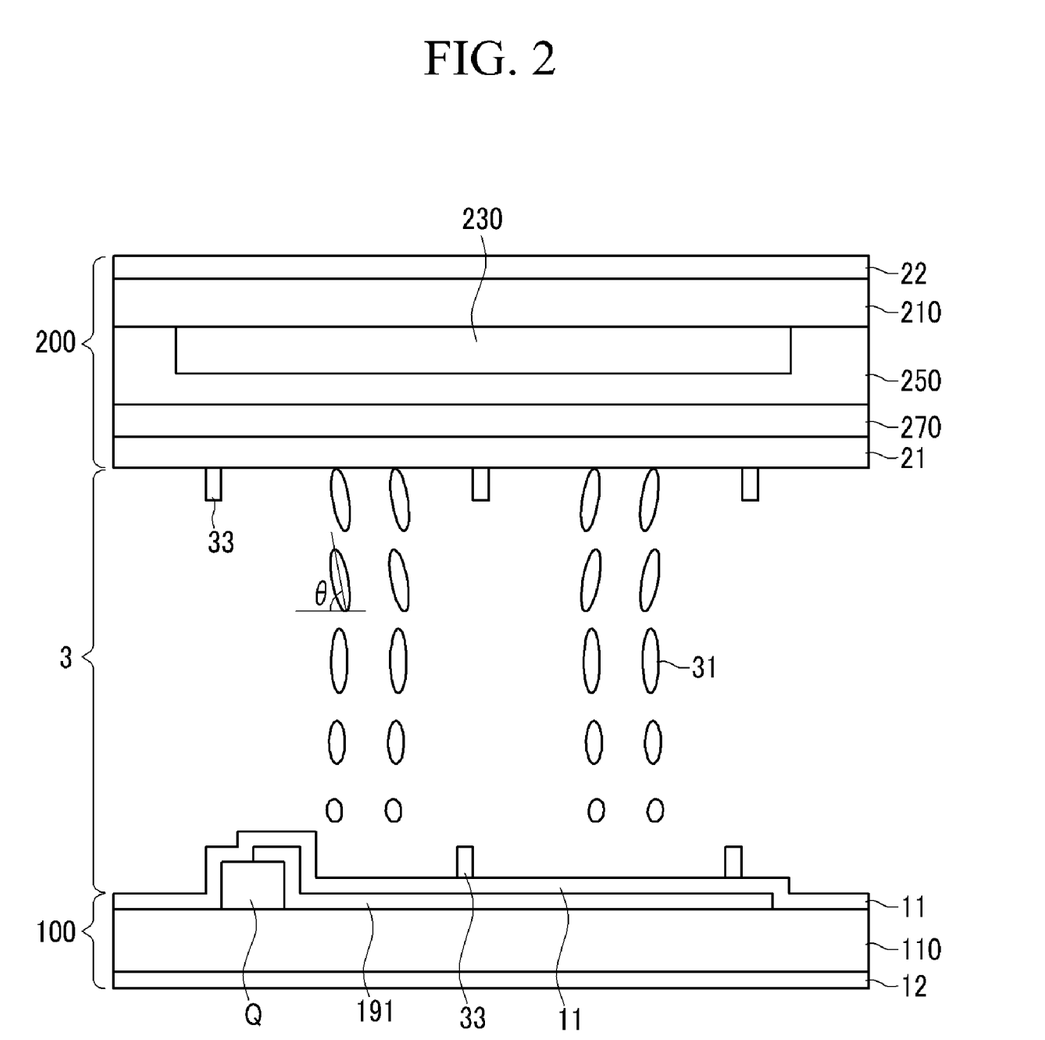
FIG. 2 is a schematic sectional view of the LCD according to the exemplary embodiment of the present invention.
Figure 3:
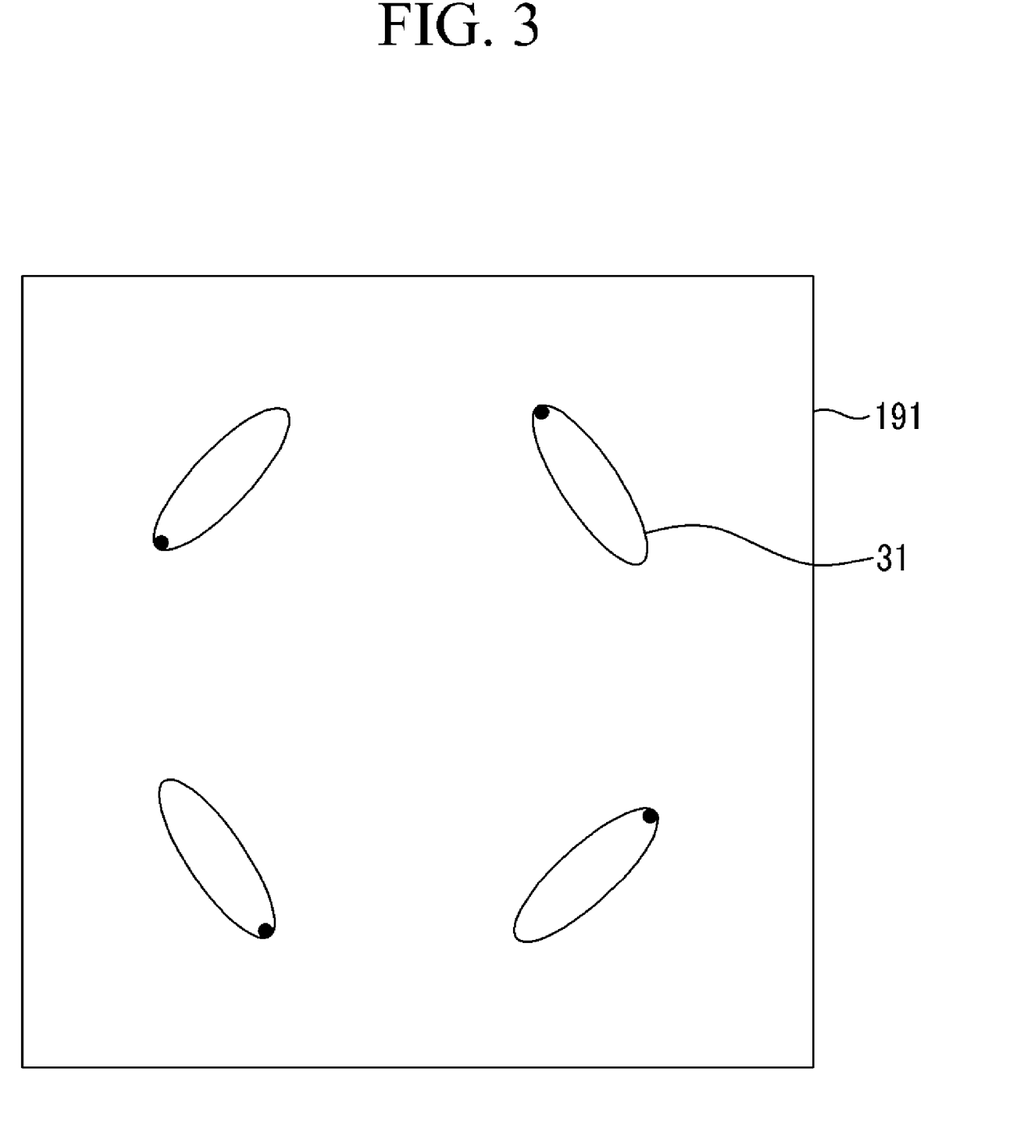
FIG. 3 is a view showing the alignment direction of the LC molecules according to the exemplary embodiment of the present invention.

FIG. 1 is an equivalent circuit diagram of a pixel of an LC panel assembly according to an exemplary embodiment of the present invention, FIG. 2 is a schematic sectional view of the LCD according to the exemplary embodiment of the present invention, and FIG. 3 is a view showing the alignment direction of the LC molecules according to the exemplary embodiment of the present invention.

Referring to FIG. 1 and FIG. 2, an LCD according to the exemplary embodiment of the present invention includes a lower panel 100, an upper panel 200 facing the lower panel 100, and an LC layer 3 interposed between the panels 100 and 200.

The lower panel 100 includes a plurality of gate lines GL, a plurality of data lines DL, and a plurality of storage lines SL.

A plurality of switching elements Q are connected to the gate lines GL and the data lines DL, a plurality of LC capacitors Clc are connected to the switching elements Q, and a plurality of storage capacitors Cst are connected to the storage lines SL. A single pixel is described in detail below.

The switching element Q may be disposed on the lower panel 100 and may have three terminals, including a control terminal connected to the gate line GL, an input terminal connected to the data line DL, and an output terminal connected to the LC capacitor Clc and the storage capacitor Cst.

The LC capacitor Clc may have two terminals, including a pixel electrode 191 disposed on the lower panel 100 and a common electrode 270 disposed on the upper panel 200. The LC layer 3 disposed between the two electrodes 191 and 270 may function as a dielectric of the LC capacitor Clc. The pixel electrode 191 may be connected to the switching element Q, and the common electrode 270 may be supplied with a common voltage Vcom and may cover an entire surface of the upper panel 200. Unlike FIG. 1 and FIG. 2, the common electrode 270 may be provided on the lower panel 100 and at least one of the electrodes 191 and 270 may have a bar or stripe shape.

The storage capacitor Cst may be an auxiliary capacitor for the LC capacitor Clc. The storage capacitor Cst may include the pixel electrode 191 and the storage line SL, which may be provided on the lower panel 100, may overlap the pixel electrode 191 via an insulator, and may be supplied with a predetermined voltage such as the common voltage Vcom. Alternatively, the storage capacitor Cst may include the pixel electrode 191 and an adjacent gate line, i.e., the previous gate line, which overlaps the pixel electrode 191 via an insulator.

For a color display, each pixel may uniquely represent one primary color (i.e., spatial division) or each pixel may sequentially represent the primary colors in turn (i.e., temporal division) such that the spatial or temporal sum of the primary colors may be recognized as a desired color. An example of a set of primary colors is red, green, and blue. FIG. 1 shows an example of spatial division where each pixel includes a color filter 230 representing one of the primary colors in an area of the upper panel 200 facing the pixel electrode 191. Alternatively, the color filter 230 may be provided on or under the pixel electrode 191 on the lower panel 100.

The common electrode 270 may be disposed on the color filters 230, and an overcoat 250 (referring to FIG. 2) to provide a flat surface may be formed between the common electrode 270 and the color filters 230.

The LC layer 3 may be a nematic LC material having negative dielectric anisotropy, and the LC molecules 310 of the LC layer 3 may be aligned at a pre-tilt angle θ of about 88-89 degrees with the surface of the substrates 110 and 210 when an electric field is not applied.

Referring to FIG. 3, the initial alignment directions of the LC molecules 310 may be classified into four directions. One pixel may include four domains having different initial alignment directions of the LC molecules 310. The initial alignment directions of the LC molecules 310 may vary and there may alternatively be three or less or five or more alignment directions if so needed.

Again referring to FIG. 2, alignment layers 11 and 21 may be coated on inner surfaces of the panels 100 and 200, respectively.

A plurality of fixing members 33 may be respectively formed on the alignment layers 11 and 21. The fixing members 33 may fix the alignment state of the alignment layers 11 and 21 to prevent the alignment force of the alignment layers 11 and 21 from decreasing over time.

Polarizers 12 and 22 may be provided on outer surfaces of the panels 100 and 200, respectively, and their polarization axes may be perpendicular to each other.

The LCD may include a plurality of retardation films (not shown) and a backlight unit (not shown) to supply light to the polarizers 12 and 22, the panels 100 and 200, and the LC layer 3.

Now, a method of manufacturing the LCD according to exemplary embodiments of the present invention will be described with reference to FIG. 4, FIG. 5, and FIG. 6.

Figure 4:
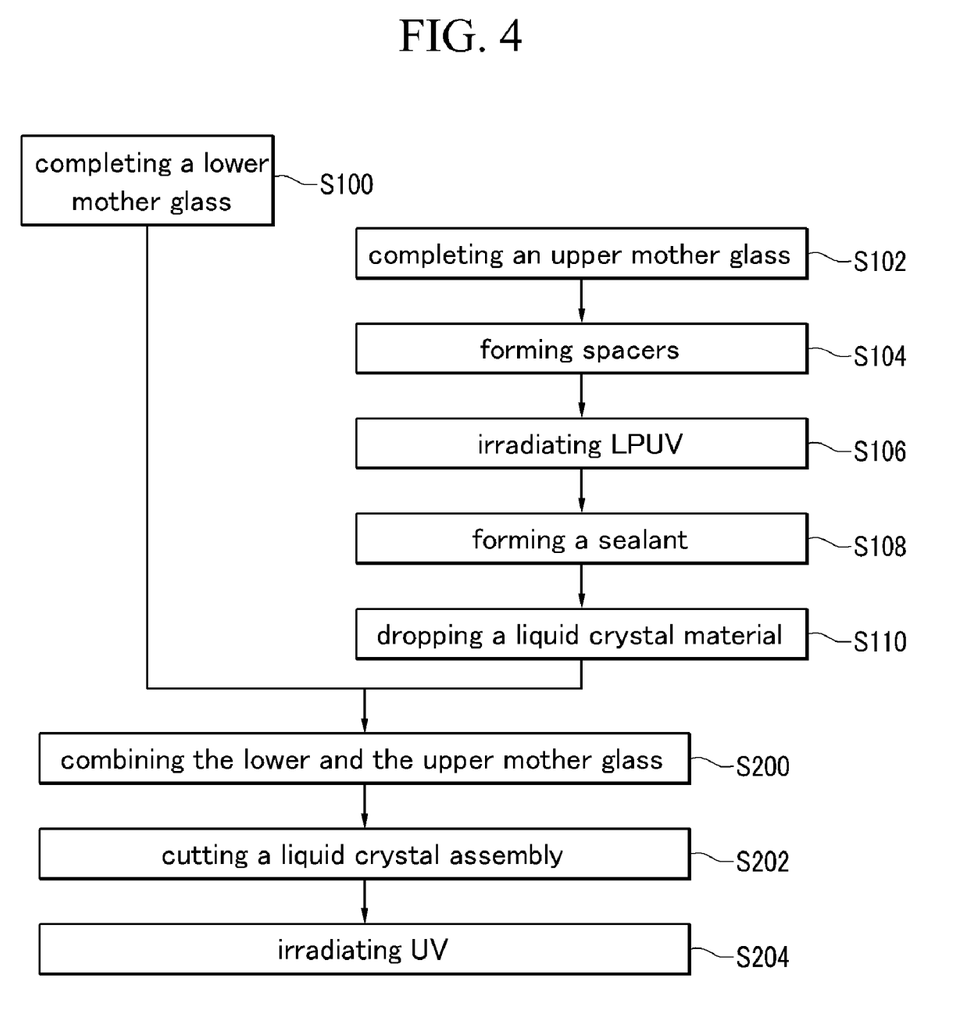
FIG. 4 is a flow chart showing the sequential steps of a manufacturing process of the LC cell for the LCD according to the exemplary embodiment of the present invention.
Figure 5:
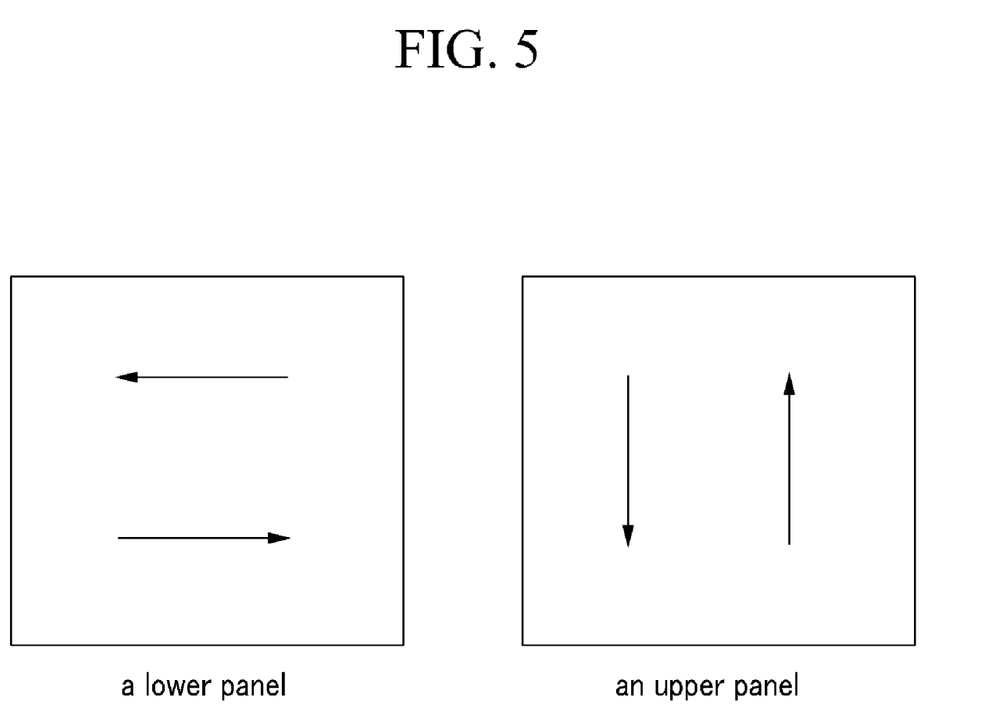
FIG. 5 is a view showing a light alignment of the LCD according to the exemplary embodiment of the present invention.
Figure 6:
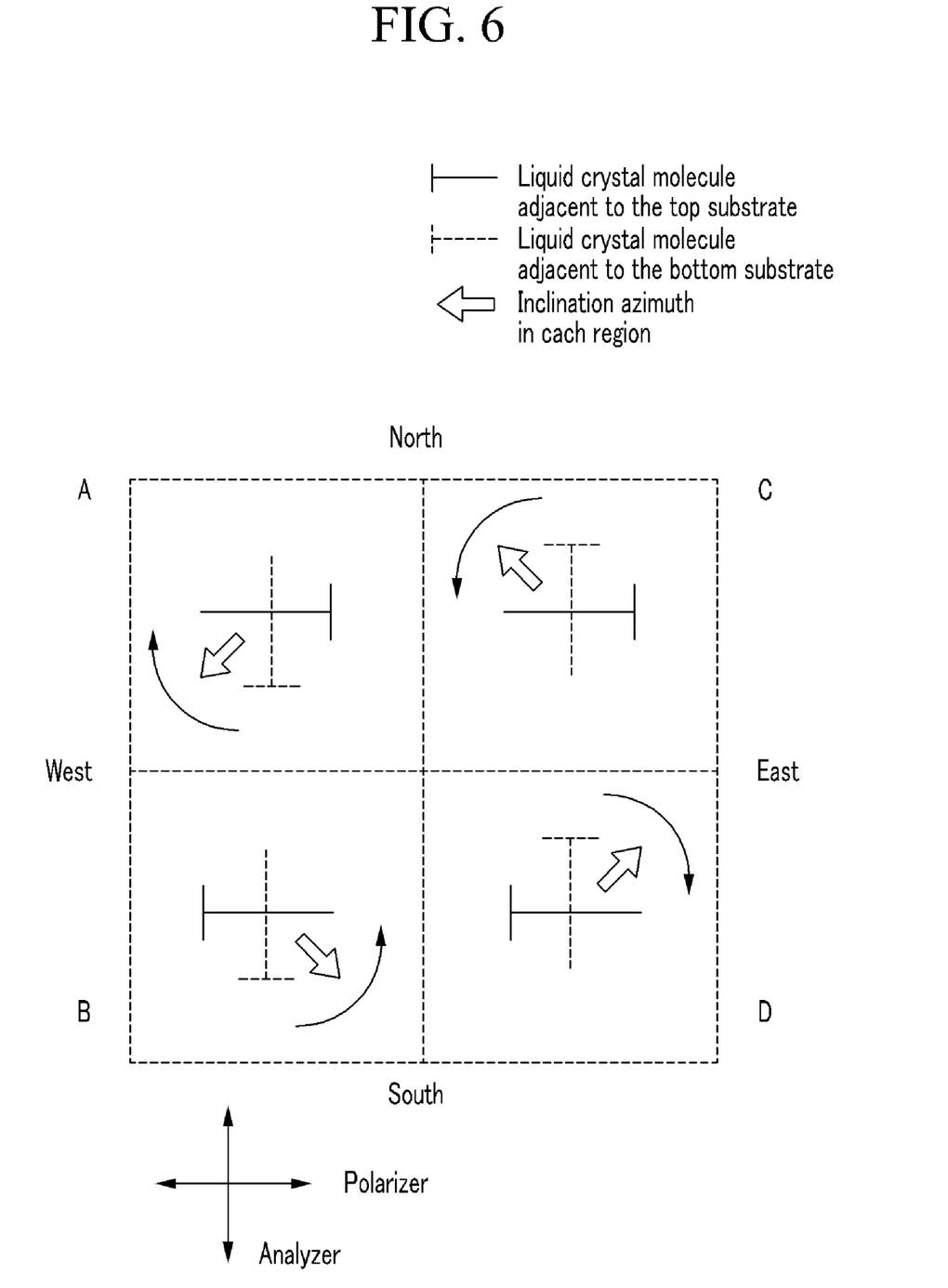
FIG. 6 is a view showing the motion of the LC molecules corresponding to the light alignment of FIG. 5.

FIG. 4 is a flow chart showing the sequential steps of a manufacturing process of the LC cell for the LCD according to the exemplary embodiment of the present invention, FIG. 5 is a view showing a light alignment of the LCD according to the exemplary embodiment of the present invention, and FIG. 6 is a view showing the motion of the LC molecules corresponding to the light alignment of FIG. 5.

As shown in FIG. 4, lower and upper mother glasses may be completed through processes S100 and S102 and then a plurality of spacers may be formed on one of the upper and lower mother glasses to maintain the uniform interval between the upper and lower mother glasses S104. The spacers may be bead spacers dispersed with a spherical shape or column spacers formed by a photolithography process.

Next, a light alignment process may be executed by irradiating the alignment layers formed on the upper and lower mother glasses with linearly polarized ultraviolet (LPUV) rays (S106).

Here, the irradiation with LPUV rays may be performed using a mask such that only portions of the alignment layers are irradiated by the LPUV rays. Also, the LPUV rays may be directed at the alignment layers at a tilted angle with respect to the surface of the alignment layers so that the alignment layers may be rubbed in a predetermined direction. To irradiate with the LPUV rays at the tilted angle, the upper and lower mother glasses may be tilted or the device for irradiating with the LPUV rays may be tilted.

Because the alignment direction of the alignment layer may be changed according to the direction of the irradiating LPUV rays, one pixel may be divided into a plurality of sub regions that are irradiated by LPUV rays at different directions. For example, one pixel may include a plurality of domains having LC molecules with different pre-tilt directions.

To align the LC molecules 310 with four initial alignment directions as shown in FIG. 3, referring to FIG. 5, the upper half of the pixel region in the lower panel may be irradiated by the LPUV rays from right to left to form a pre-tilt angle, and the lower half of the pixel region in the lower panel may be irradiated by the LPUV rays from left to right to form a pre-tilt angle. Also, in the upper panel, the left half of the pixel region may be irradiated by the LPUV rays from top to bottom to form a pre-tilt angle, and the right half of the pixel region may be irradiated by the LPUV rays from bottom to top to form a pre-tilt angle.

When executing the light alignment by this method, as shown in FIG. 6, the alignment directions of the LC molecules (represented with solid lines and dotted lines) may be changed as represented by the thick arrow lines extending from the lower panel to the upper panel. Also, four domains having different initial alignment directions of the LC molecules are formed in one pixel.

The pre-tilt angle of the LC molecules may be changed according to the energy level of the LPUV rays, and the pre-tilt angle of the LC molecules may be decreased when the energy level of the LPUV rays is increased. Accordingly, the pre-tilt angle of the LC molecules may be controlled by controlling the energy level of the LPUV rays. The pre-tilt angle of the LC molecules may be in the range of 88-89 degrees in the exemplary embodiment according to the present invention.

Next, a sealing member to define the portion where the LC layer is formed and to prevent leakage of the LC layer may be formed on one of the two panels (S108). The sealing member may include a material that can be hardened by ultraviolet rays to combine the two panels.

Next, mixtures including LC molecules, a photo initiator, and monomers that may be polymerized by light may be drip formed on one of the two panels (S110).

The monomers may be injected in an amount such that the monomers interfere with the movement of the LC molecules after forming the fixing member. The monomers may include an acrylate based compound, and the content of the monomers may be in the range of 0.01-10 wt % with respect to the content of the LC molecules. Also, the content of the photo initiator may be in the range of 0.01-0.05 wt % with respect to the content of the LC molecules. Such an amount of photo initiator may cause the polymerization reaction of the monomer and the photo initiator may be include 2,2-dimethoxy-1, 2-diphenyl ethanone.

Next, the sealing member may be irradiated to harden the sealing member disposed between the two mother glasses after combining the two mother glasses (S200) to complete an LC assembly.

Here, a mask may be used to selectively irradiate the sealing member.

Next, the LC assembly may be divided into a plurality of LC cells by scribing the LC assembly according to a cutting line (S202).

Next, ultraviolet rays may vertically irradiate the LC cell to form a plurality of fixing members (S204). The ultraviolet rays may be LPUV rays. The LPUV rays may irradiate the front side or the rear side of the LC cell or the front side and the rear side may be irradiated simultaneously. The intensity of the LPUV rays may be in the range of 2-20 J/cm$^2$.

Here, the monomers may be polymerized by the photo initiator and the polymerized polymer may be adhered to the surface on the alignment layers to form the fixing member.

On the other hand, a voltage of 2-20 V may be applied to the two panels when irradiating light. The voltage may be applied using visual pads or other pads, and an alternating current or a direct current may be used. The applied voltage may increase the control force so that the monomers in the LC layer may be easily moved and then the polymerization reaction may be improved.

In an alternative LC injection method for injecting the LC material between the two panels, the plurality of LC cells may be divided and then the LC material may be injected between the two panels. Then the LC cells may be irradiated.

Embodiment 2

Figure 7:
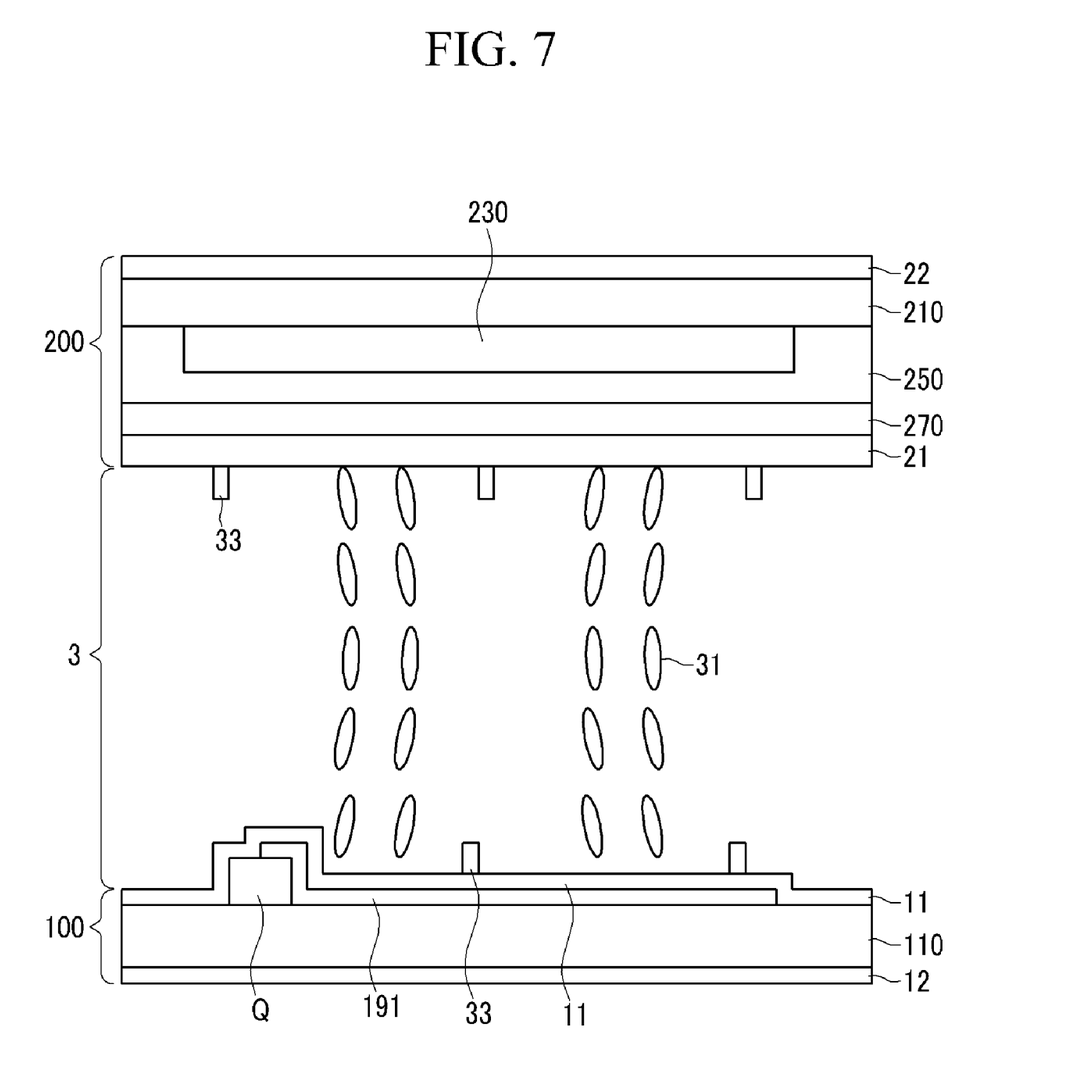
FIG. 7 is a schematic sectional view of the LCD according to another exemplary embodiment of the present invention.
Figure 8:
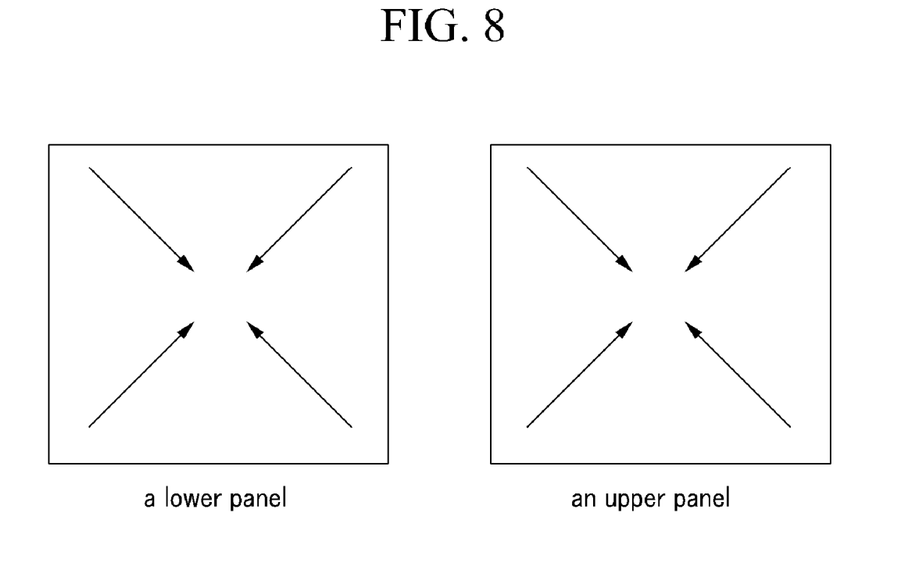
FIG. 8 is a view showing a light alignment of the LC molecules of the LCD of FIG. 7.
Figure 9:
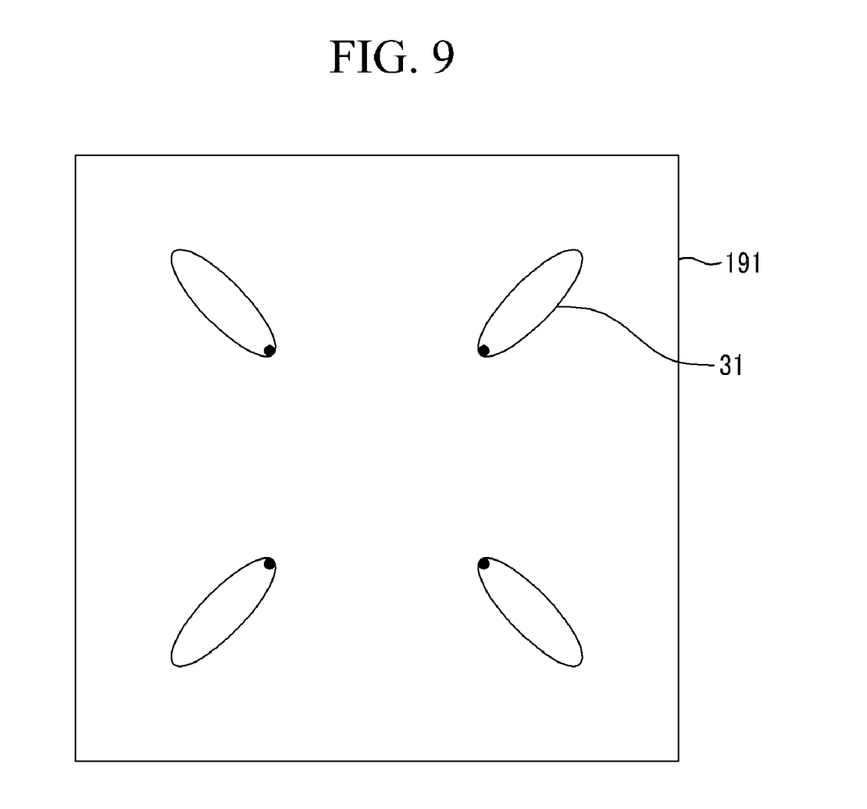
FIG. 9 is a view showing the alignment direction of the LC molecules corresponding to the light alignment of FIG. 8.

FIG. 7 is a schematic sectional view of the LCD according to another exemplary embodiment of the present invention, FIG. 8 is a view showing the light alignment of the LC molecules of the LCD of FIG. 7, and FIG. 9 is a view showing the alignment direction of the LC molecules corresponding to the light alignment of FIG. 8.

Because the structure of the LC display shown in FIG. 7 is the same as that shown in FIG. 2, a description of elements that are the same is omitted.

The LC display shown in FIG. 7 includes four domains having different LC molecule 31 directions in each pixel, like FIG. 2. However, the alignment directions of the LC molecules 31 are different than that of FIG. 2, as is the method for aligning the different directions of the LC molecules 31.

In this exemplary embodiment, as shown in FIG. 8, the direction of the light alignment of an upper panel may be the same as the direction of the light alignment of a lower panel. That is to say, the light alignment may be executed to form a pre-tilt angle with an oblique direction from the four corners of each pixel electrode 191 to the center of each pixel electrode 191.

Therefore, as shown in FIG. 9, the LC molecules 31 may be aligned on a slope from the four corners of each pixel electrode 191 to the center of each pixel electrode 191 such that four domains having different initial alignment directions of the LC molecules 31 are formed.

As above described, the light alignment may be used to align the LC molecules with various directions without the need for patterning of the pixel electrodes. As such, a wide viewing angle may be obtained.

Furthermore, because the pixel electrodes and the common electrode do not need to be patterned, the electric charges may be amassed in arbitrary positions. Accordingly, damage to the polarizers due to electric charges may be prevented and a process for removing the electrostatic charges to prevent damage of the polarizers may be omitted.

Furthermore, fixing members may be formed on the surface of the alignment layers so that the initial light alignment of the alignment layers is scattered. Accordingly, the quality of the LC display may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
   a first panel and a second panel facing each other;
   a first alignment layer disposed on the first panel;
   a second alignment layer disposed on the second panel;
   liquid crystal materials disposed between the first panel and the second panel, the liquid crystal materials comprising liquid crystal molecules having a pre-tilt angle in a range of 88-89 degrees and being disposed on the first and the second alignment layers;

a polymer disposed between one of the first alignment layer and the liquid crystal materials the second alignment layer and the liquid crystal materials, and both the first and second alignment layers and the liquid crystal materials;

wherein the first and the second alignment layers comprise reacted photopolymer.

2. The liquid crystal display of claim 1, wherein the polymer is a polymerization reaction of monomer.

3. The liquid crystal display of claim 1, wherein the first alignment layer comprises a first portion pre-tilted in a first direction and a second portion pre-tilted in a second direction opposite the first direction, and wherein the second alignment layer comprises a third portion pre-tilted in a third direction crossing the first direction and a fourth portion pre-tilted in a fourth direction opposite the third direction.

4. The liquid crystal display of claim 3, wherein the liquid crystal molecules are aligned with a slope of a counterclockwise direction in a single pixel, and has four domains.

5. The liquid crystal display of claim 1, wherein the first alignment layer comprises a first portion, a second portion, a third portion, and a fourth portion with a first pre-tilt direction, a second pre-tilt direction, a third pre-tilt direction, and a fourth pre-tilt direction, respectively, and wherein the second alignment layer comprises a fifth portion, a sixth portion, a seventh portion, and an eighth portion with the first pre-tilt direction, the second pre-tilt direction, the third pre-tilt direction, and the fourth pre-tilt directions, respectively.

6. The liquid crystal display of claim 5, wherein the liquid crystal molecules are aligned with a slope from four corners of a single pixel to a center of the single pixel, and the single pixel has four domains.

7. The liquid crystal display of claim 1, further comprising a pixel electrode disposed between the first panel and the first alignment layer, wherein the pixel electrode does not have a cutout, a protrusion, or a slit.

8. A method for manufacturing a liquid crystal display, comprising:

providing a first panel comprising a first alignment layer;
providing a second panel comprising a second alignment layer;
forming an alignment structure on the first alignment layer and the second alignment layer by irradiating the first and the second alignment layers with ultraviolet rays;
providing a liquid crystal assembly comprising:
the first panel,
the second panel, and
a liquid crystal layer comprising a liquid crystal material, a monomer, and a photo initiator disposed between the first panel and the second panel; and
polymerizing the monomer by irradiating the liquid crystal assembly with ultraviolet rays, thereby forming a polymer,
wherein the liquid crystal material comprises liquid crystal molecules, and
wherein liquid crystal molecules are aligned with a pre-tilt angle of 88-89 degrees with respect to the surface of the first panel and the second panel by the alignment structure of the first alignment layer and the second alignment layer.

9. The method of claim 8, wherein the irradiating the first and the second alignment layers uses linearly polarized unltaviolet rays and a photo mask to selectively form various pre-tilt directions.

10. The method of claim 9, wherein first alignment layer comprises an alignment structure made by firstly irradiating the first alignment layer with ultraviolet rays to form a pre-tilt angle in a first direction and secondly irradiating the first alignment layer with ultraviolet rays to form a pre-tilt angle in a second direction opposite the first direction, and wherein the second alignment layer comprises and alignment structure made by thirdly irradiating the second alignment layer with ultraviolet rays to form a pre-tilt angle in a third direction crossing the first direction and fourthly irradiating the second alignment layer with ultraviolet rays to form a pre-tilt angle in a fourth direction opposite the third direction.

11. The method of claim 10, wherein the liquid crystal material comprises liquid crystal molecules, and wherein the liquid crystal molecules are aligned with a slope of a counterclockwise direction in a single pixel, and the single pixel has four domains.

12. The liquid crystal display of claim 9, wherein the first alignment layer comprises an alignment structure made by repeatedly irradiating the first alignment layer with ultraviolet rays to form a pre-tilt angle with a first direction, a second direction, a third direction, and a fourth direction, respectively, and wherein the second alignment layer comprises an alignment structure made by repeatedly irradiating the second alignment layer with ultraviolet rays to form a pre-tilt angle with the first direction, the second direction, the third direction, and the fourth direction, respectively.

13. The liquid crystal display of claim 12, wherein the liquid crystal material comprises liquid crystal molecules, and wherein the liquid crystal molecules are aligned with a slope from four corners of a single pixel to a center of the single pixel, and the single pixel has four domains.

14. The method of claim 8, wherein the contents of the photo initiator are in a range from 0.01 to 0.1 wt% with respect to the contents of the liquid crystal material.

15. The method of claim 14, wherein the photo initiator comprises 2,2-dimethoxy-1,2-diphenyl ethanone.

16. The method of claim 8, wherein the contents of the monomer are in a range from 0.01 to 10 wt% with respect to the contents of the liquid crystal material.

17. The method of claim 16, wherein the monomer comprises an acrylate based compound.

18. The method of claim 8, wherein the intensity of the ultraviolet rays is in a range from 2 to 20 $J/cm^2$ when the monomer is polymerized.

19. The method of claim 8, wherein a voltage of 2-20 V is applied to the first panel and the second panel when polymerizing the monomer.

* * * * *